United States Patent [19]
Mann et al.

[11] 3,938,752
[45] Feb. 17, 1976

[54] AUXILIARY DRIVE ENDLESS LOOP TAPE CARTRIDGE

[76] Inventors: Donald V. Mann, 4620 Geary Blvd.; Herman C. Mann, 426 Oxford St., both of San Francisco, Calif. 94118

[22] Filed: Oct. 19, 1973

[21] Appl. No.: 408,143

Related U.S. Application Data

[63] Continuation of Ser. No. 880,201, Nov. 26, 1969, abandoned.

[52] U.S. Cl. ............................ 242/55.19 A; 226/183
[51] Int. Cl. ............................................. B65h 17/48
[58] Field of Search .......... 242/55.19 A, 55.19, 198, 242/199, 200; 360/91, 92, 93; 226/191, 194; 352/78, 128, 183

[56] References Cited
UNITED STATES PATENTS

| | | | |
|---|---|---|---|
| 2,778,637 | 1/1957 | Eash | 242/55.19 A |
| 2,908,769 | 10/1959 | Fonda | 242/55.19 A |
| 2,921,787 | 1/1960 | Cousino | 242/55.19 A |
| 3,285,527 | 11/1966 | Cole, Jr. | 242/55.19 A |
| 3,310,214 | 3/1967 | Nesin | 226/191 X |
| 3,559,908 | 2/1971 | Esashi | 242/55.19 A |
| 3,633,837 | 1/1972 | Esashi | 242/55.19 A |
| 3,653,601 | 4/1972 | Wrona | 242/55.19 A |

OTHER PUBLICATIONS
German Printed Publication No. 1,286,306, Philips, 1–1969.
German Printed Publication No. 1,020,190, Honolka, 11–1957.

*Primary Examiner*—Billy S. Taylor
*Attorney, Agent, or Firm*—Phillips, Moore, Weissenberger Lempio & Strabala

[57] ABSTRACT

Commercially available cassette cartridges which are reel-to-reel magnetic tape cartridges of a standard size and design can be converted to endless loop cartridges by replacing one of the reels with an auxiliary drive assembly including a drive hub with adjacent guides to insure positive driving in contact between the tape and the drive hub and replacing the other reel with a free wheeling tape platen with an endless loop of magnetic tape wound spirally thereon which is threaded so its innermost convolution is pulled from the hub of the platen by the combined action of the capstan drive and the forward reel drive of the recorder to insure positive tape transport without wow and flutter and returns to the peripheral tape convolution on the platen.

18 Claims, 8 Drawing Figures

FIG_1

FIG_2

FIG_3

FIG_5

FIG_4

FIG_6

FIG_7

FIG_8

AUXILIARY DRIVE ENDLESS LOOP TAPE CARTRIDGE

This is a continuation of application Ser. No. 880,201, filed Nov. 26, 1969, and now abandoned.

BACKGROUND OF THE INVENTION

A number of cartridges have been developed which employ a continuous tape loop for magnetic tape recorders since such cartridges offer a number of unique features, such as immediate reply without rewinding or reversing the cartridge. Typical examples of the endless loop type cartridge are shown in U.S. Pats. Nos. 2,778,635; 2,778,636, and 2,778,637 issued to Eash and U.S. Pat. No. 2,426,838 issued to Miller.

When employing the endless loop tape cartridges referred to in the above patents, special recorders are required to meet the necesssary drive system for tape transport as well as other specifications to insure positive tape feed without wow and flutter. While the above specialized tape cartridge will function properly in their tailor made recorders, they are not suitable for use in the commercially marketed "Cassette Recorder" which are all designed to use a reel-to-reel type cartridge of a standard size and design. These recorders are manufactured and sold commercially by a number of different companies and their standardized reel-to-reel cassette cartridges are loaded with varying amounts of magnetic tape. Commonly, these cassette cartridges have from 30 to 60 minutes of tape load the cartridges are reversed in the cassette recorder to employ both halves (tracks) of the magnetic tape thereby doubling their effective tape load in minutes.

While the reversal of these cassette cartridges within the recorder will rewind the other half or track of the tape as a track is utilized, reversing the cartridges in the recorder is difficult to accomplish automatically. Further, in many of the applications where cassette recorders are employed, a number of sophisticated switching techniques are required to reverse the tape transport to rewind the tape and to sense the end of the tape transport as the last convolution leaves a reel.

One of the features which has made the cassette recorder such a widely purchased machine is its compactness and convenience of the recorder and the tape cartridges. As a result, its compactness requires that the capstan drive be quite small (a diameter of approximately 0.079 inch) and therefore the surface area of the tape on which the capstan operates to drive the tape is quite limited. In order to insure positive speed, these types of recorders employ a forward drive reel which is clutched in the cassette drive system and drives the take-up reel to help the capstan achieve smooth uniform tape transport to avoid wow and flutter in the recording being made on or reproduced from the tape. Since normally the power required for tape transport is greater in an endless loop tape arrangement than reel-to-reel arrangements satisfactory endless loop cartridges have not been available for cassette recorders.

An object of the present invention is to provide a satisfactory continuous loop cassette cartridge for the currently commerically available cassette recorders, which will require no modification to the recorder to employ the novel cartridge.

A further object of the invention is to provide a cassette cartridge with an endless loop contained therein which is compatible with the cassette recording machines currently marketed in the United States.

It is also an object of the present invention to provide an endless loop cassette cartridge of substantially the same size and outward appearance as convention reel-to-reel cassette cartridges so that the endless loop cassette cartridge will be compatible with various automatic changing mechanisms for cassette cartridges.

An ancillary object of the invention is to provide an endless loop cassette cartridge with internal switching devices whereby positive tape indexing can be achieved through conductive patches on the endless tape loop which will close contacts within the novel cartridge thereby making the novel cartridge even more suitable for a number of applications.

A further object of the present invention is to provide a reliable and economical endless loop cassette cartridge for conventional cassette recorders which is serviceable and troublefree in operation.

A number of other objects and advantages will be apparent from the following description of the present invention.

SUMMARY OF THE INVENTION

The above objects of the instant invention will be accomplished and the advantages obtained by utilizing a standard hollow cassette cartridge and replacing one of the reels with a tape platen with an attached hub and an endless spool of magnetic tape coiled thereon whose threading loop passes across the guides in the case where it can engage the magnetic heads and drive capstan of a cassette recorder and thence to an auxiliary drive system which replaces the other reel of the cassette cartridge from which the threading loop returns to the endless spool. The auxiliary drive means is drivingly connected to the forward reel drive sprocket of the cassette recorder when the endless loop cassette cartridge is inserted in such a recorder thereby providing the capstan drive a driving assist on the tape during normal play/record tape transport and also providing fast forwarding feature for tape transport so that desired portions of the magnetic tape loop can be quickly selected by employing the fast forwarding drive of the recorder.

More specifically, a hollow cartridge case of approximately the same design or dimensions of the convention reel-to-reel cartridge cases is employed and includes a circular tape platen having an attached tape hub mounted inside the case and journalled over one of the drive sprocket apertures, an endless spool magnetic tape spirally coiled on the circular tape platen having a threading loop egressing from said spool contiguous to said tape hub and returning to the periphery of said spool, guide means for supporting the threading loop for engagement with a capstan drive of a cassette recorder and its magnetic heads when the cassette cartridge is inserted in such a cassette recorder, an auxiliary drive means journalled over the other drive sprocket aperture of the case with the threading loop of the spool threaded through this auxiliary drive means and coupling drive means connecting said auxiliary drive hub to the forward reel drive sprocket of a cassette recorder when the cassette cartridge is inserted in such a recorder whereby the forward reel drive sprocket of the cassette recorder will assist the capstan drive during play/record tape transport and will provide fast forwarding of the endless tape so selected portions can be quickly obtained. Normally, the egressing tape drives the tape platen and drive means can be provided between the inner convolutions of the tape and the platen and its tape hub whereby a positive drive is assured so the outer convolutions of the tape will not tighten on the platen. Also, switching means are employed whereby conductive strips placed on the endless loop will activate such switching means for indexing the endless spool of magnetic tape, as tape transport is occuring.

BRIEF DESCRIPTION OF THE DRAWINGS

The invention will be better understood when reading the description by referring to the attached drawings wherein.

DESCRIPTION OF AN EMBODIMENT

Figure 1:
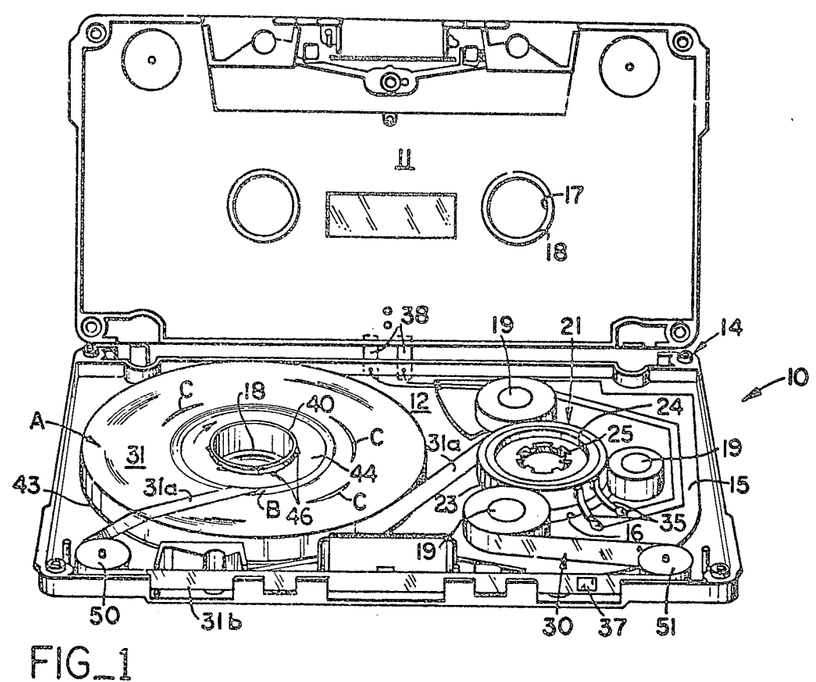
FIG. 1 is a perspective of the novel endless loop cassette cartridge of this invention opened in a clamshell like manner to show the internal details of the tape transport and auxiliary drive arrangements.

One of the arrangements of the internal parts in the novel endless loop cassette cartridge 10 is shown in FIG. 1 wherein the top half 11 of the cartridge has been hinged upwardly about its back edge to reveal the arrangement of its internal parts on the inside surface 12 of the lower half 13 of the cartridge case 14. This cartridge case is a standard cassette cartridge design and its exterior dimensions are substantially identical to the cassette cartridges currently available from a number of different commercial sources. In the instant invention the conventional internal reel-to-reel mechanisms are not employed and the assemblies of the invention are employed to convert the cartridge case into an endless loop cassette cartridge.

In the embodiment shown in FIG. 1 a floating guide plate 15 with an open-sided aperture 16 is positioned on the inside surface 12 of the lower half 13 of the case that its aperture encircles the drive sprocket aperture 17 which is surrounded by a raised guide lip 18 projecting upwardly from surface 12. This guide plate can be fabricated of metal or plastic and forms a floating support for plurality of bearing posts 19 extending perpendicularly from the surface of the guide plate and preferably clustered about the aperture. Mounted on these guide posts are idler wheels 20 which form a circular cluster about the aperture and physically constrain a drive hub 21 within this circular array. Preferably, each idler wheel and its associated bearing post includes a one-way clutch 22 that will allow the idler wheel to free-wheel in one direction but restricts its rotation in the opposite direction. The direction of rotation has been indicated on the idler wheels with arrows. Conventionally, these one-way clutches can take the form of a simple spring wire connected to the post which is associated with ratchet like teeth formed in the wall of the bore in each idler wheel so the spring wire will catch in the teeth if it is rotated in one direction but will not engage the teeth in the opposite direction.

The auxiliary drive hub 21 includes an outer peripheral drive surface or ring 22 usually formed of a soft elastomer, such as sponge rubber or a similar material so that it can be slightly deformed by the constraining action of the idler wheels 20 clustered about its periphery. Generally, this thickness of the peripheral drive surface or ring will vary from ⅛ to ¼ of an inch depending upon the degree of deformation desired to insure a positive tape drive with the drive hub. Using sponge rubber or a similar material, mechanical damage to the magnetic tape is avoided as it passes between the several idler wheels and the peripheral surface of the drive hub. Since the drive hub is not a reel having one end of the tape attached thereto it is important to insure positive drive between the drive hub and the loop of tape which partially surrounds it.

In both the bottom and top portions of the drive hub are central annular recesses 24 which allow its drive hub to be generally centered by the guide lips 16 encircling the drive sprocket aperture 17 on the inside surfaces of the top and bottom halves of the case of the cartridge.

With the drive hub centrally over the drive sprocket aperture, a tooth annular opening 25 in the center of the hub will be coupled with the forward reel drive sprocket of the cassette recorder when the cartridge is inserted in the cartridge recess of the recorder. Since the forward reel drive sprocket provides a forward drive with a slipping clutch arrangement, the drive hub will be able to assist the capstan drive of the recorder in achieving uniform and smooth tape transport so that good fidelity can be maintained in the new endless loop cassette.

Figure 7:
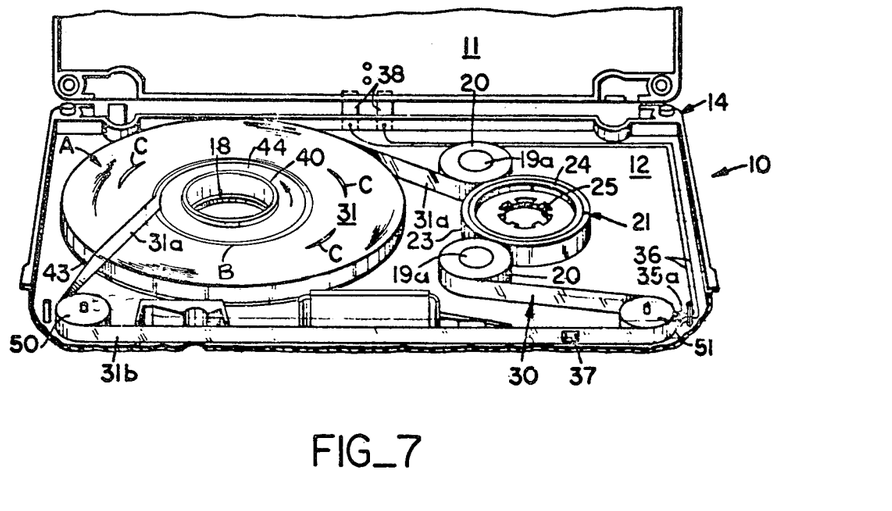
FIG. 7 is a perspective of the cassette shown in FIG. 1 with parts broken away which employs an alternate threading and guide roller arrangement and different switching contacts.

As indicated above, the drive hub is encircled by a soft elastomer drive surface or ring 23 which is typically deformed in several locations by the cluster of surrounding idler wheels 20 on the guide plate 15. An alternate embodiment as illustrated in FIG. 7 wherein the floating guide plate on which the clusters of guide rollers are mounted is not employed. In this alternate embodiment, a somewhat greater deformation of the elastomer drive surface or ring is usually employed to eliminate the necessity of the self-centering feature on the forward reel drive sprocket provided by the guide plate. By making the thickness of this elastomer drive surface or ring 23 of a sufficient depth, a positive tape-to-drive hub drive can be accomplished so long as some deformation of the elastomer drive surface or ring is maintained within the alignment limits of the drive hub on the forward reel drive sprocket of the cassette recorder.

When using the thicker elastomer drive surface or ring the idler rollers 20 can be mounted on stationary bearing posts 19a which are attached to the inside surface 12 of the lower half of the case 14 as illustrated in FIG. 7. Preferably, these stationary bearing posts will be positioned about the guide roller at locations less than 180° apart and so located at least 180° of the elastomer drive surface will be threaded with the tape as it is looped between the idler wheels and the circular drive surface.

Generally, the loop tape between its exit from the endless spool and its return to the spool is referred to as the threading loop. In the instant invention, the threading loop 30 of the continuous loop of magnetic tape 31 is received between the idler wheels 20 and the peripheral drive surface or ring 23 of the drive hub 21 in a positive no-slip drive. As a result of this positive drive, the forward reel drive sprocket of the conventional cassette recorder will assist the capstan in advancing the magnetic tape in a smooth uniform manner.

In addition to assisting the capstan drive of the cassette recorder to achieve a smooth uniform tape transport to eliminate wow and flutter, the auxiliary drive hub arrangement provides an outstanding feature in the instant invention. Since the forward reel drive sprocket is also the fast forward drive of the cassette recorder, it is possible to have fast forwarding with the continuous loop cassette cartridge of this invention without any modification to the cassette recorder. In the fast forward mode, the capstan is disengaged from the tape and the forward reel drive sprocket through the drive hub drives the threading loop as the endless loop of magnetic tape is being fast forwarded to obtain a selected portion of the magnetic tape. Thus, the instant invention provides a continuous loop cassette cartridge in which a positive uniform tape transport is available by the auxiliary drive assisting the capstan and in addition provides a fast forwarding mode to quickly select various portions of the continuous loop of tape for immediate use.

It should be appreciated that the auxiliary drive direction, even if the cassette is inserted in a reverse manner (upside down) will be in the proper direction when the rewind mode of the cassette is operated. This will eliminate any serious problems that otherwise might occur by improper insertion of new continuous loop cassette cartridges in the recorder. Further, the one-way clutches 22 employed both on the platen (more fully described hereinafter) and the idler wheels 20 will prevent the tape transport from reversing should the capstan be engaged (the play or record modes) with the continuous loop cassette cartridge inserted upside down. In such a situation, the capstan will have no auxiliary assist and the restriction on the direction of tape transport due to the one-way clutches will prevent the capstan from reversing the tape transport which would tangle the tape in the cartridge.

When the floating guide plate 15 is made of plastic, two finger-like contacts 35 can be attached directly to the plastic plate surface adjacent to the drive hub 21 and printed circuit leads 36 can be applied to the surface of this plastic. These finger-like contacts are arranged to bear against the lubricated surface 31b of the threading loop as it passes around the drive hub thereby insuring a positive engagement of these contacts with the surface of the tape since the surface of the drive hub forms a backing member, supporting the tape. The finger-like contacts are spaced closely to one another and by placing a conductive patch 37 on the tape that will complete a circuit between the two finger-like contacts as it passes therebeneath during tape transport a positive switch is provided. A number of such patches may be used to index a recorded cartridge or to accomplish switching for instrumentation. In the reel-to-reel type cassette, switching is often accomplished by recording tones on the tape in order that tone responsive electronic circuits can accomplish the necessary switching. Alternately, switching can be accomplished by the chanage in tension on the tape when a reel is depleted. In the instant invention, a simple inexpensive light circuit with a battery or similar device can be used for indexing. When a number of tunes have been placed on a continuous loop cassette cartridge, the operator need only hear portions of one tune and then push the fast forward button until the appropriate number of indexing marks have been passed to obtain the selection desired.

So the switching system will be compatible with the existing cassette recorders, the printed circuit leads are respectively connected to two metallic contact strips 38 on the back edge of the case and these contacts are coupled to an appropriate external switching circuit.

Figure 5:
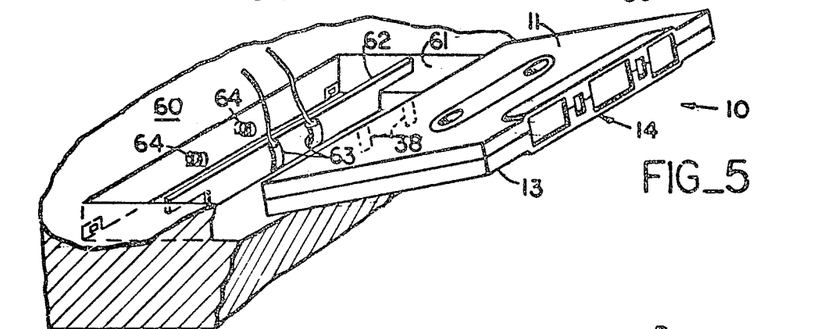
FIG. 5 is a perspective of a broken-away portion of the cartridge recess of a conventional cassette recorder and a cassette illustrating how the internal switching provided in the endless loop cartridge can be connected to external control or indexing circuitry.

Since the recess for various cassette recorders may differ slightly, it is necessary to provide a universal means by which the switching contacts within the cassette cartridge can be conveniently connected to external switching circuits as described above. In FIG. 5 a portion of the cassette cartridge recess of a cassette recorder 60 is shown with a cartridge being inserted into the recess 61. To connect the internal switching system of the cassette to external circuitry, a thin insulating plate 62 of the same width of the recess is placed behind the cartridge case 14 so that contact strips 38 on the cartridge case will register with electrical contact strips 63 on the plate. Thus, as the case is inserted into its recess, this strip will be sandwiched between springs 64 of the recorder and the back side of the case insuring positive engagement between these pairs of contact strips. Leads from contact strips on the plate can be then coupled to the appropriate external switching circuit. Further, the use of the plate and contact strips provide a convenient simple method whereby subsequent endless loop cassette cartridges can be coupled to the external switching circuits (not shown).

Obviously, if the floating plate 15 is constructed of metal, insulation must be provided for the finger-like contacts 35 and two insulated leads must connect these contacts with the contact strips 38.

Further, it is often desirable to construct one of the idler wheels 20 on the floating guide plate 15 of a conductive rubber which is coupled directly to its supporting bearing post 19 through commutation with the post which is connected to a ground in order to discharge any static electricity accumulating on the endless tape loop.

It should be appreciated that the guide plate 15 floats so that the sprocket opening 25 in the drive hub 21 will register properly with the forward reel drive sprocket of the recorder without changing the engaging pressures of the idler wheels 20 against the drive surface or ring of the drive hub. While it is desirable that idler wheels be employed, stationary "Teflon" rub blocks can be clustered about the drive hub in a manner similar to the idler wheels. While such an arrangement will increase the drag involved in the tape transport slightly, it is possible since a positive drive between the tape and the auxiliary drive hub is available. In addition, it should be appreciated that while simple non-flanged idler wheels are shown in most of the figures, these idler wheels can include top and bottom radially projecting flanges 20a (see FIG. 4) to provide an associated tape guide as the magnetic tape rolls across their revolving surfaces.

Typically, the drive hub 21 inclusive of its soft elastomer drive surface or ring 23 will have a diameter of approximately 1 inch. However, this diameter may be varied to meet certain parameters and, of course, where high speed fast forwarding is a dominant feature, it may be desirable to increase the diameter of the drive hub in order to achieve faster tape transport during the fast forwarding mode. Such an application might arise in instrumentation where the new continuous loop tape cassette cartridge will find many applications.

Figure 2:
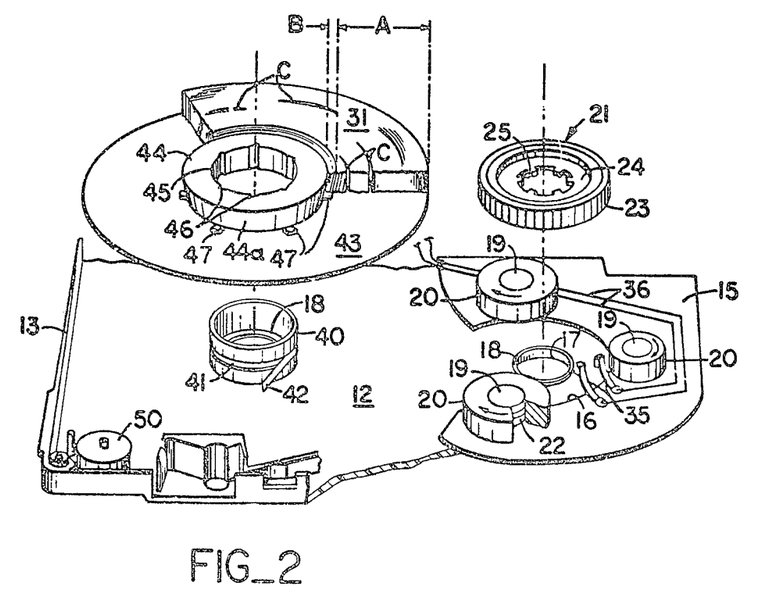
FIG. 2 is a broken-away perspective of the bottom portion of the cassette cartridge shown in FIG. 1 with parts of the endless loop drive mechanism exploded to show additional detail.

On the side of the cassette case 14 opposite to that containing the auxiliary drive arrangement described above, a bearing sleeve 40 is attached to guide lip 18 of the sprocket aperture 17. This sleeve usually includes a central circular groove 41 having a spring steel wire 42 attached therein so that its unattached end will spring outwardly from the bearing post. This spring wire forms one-half of the one-way clutch system for the tape platen 42 and its associated tape hub 44. The tape hub includes a bore 45 that is received on the bearing sleeve and the inside surface of its bore is provided with a plurality of notches or teeth 46 which are cut obliquely to the wall surface to form a circular ratchet that forms the other half of the one-way clutch. Depending upon the angle of the notches and the orientation of the spring wire, the one-way clutch can be arranged for opposing either clockwise or counterclockwise rotation in the tape hub. In FIG. 2, the one-way clutch is arranged to prevent counterclockwise rotation of the platen and its tape hub, while in FIG. 6 the clutch is arranged to oppose clockwise rotation of the tape platen and its associated hub. Since several threading arrangements are illustrated in the figures, the appropriate clutch direction will vary. Also, one-way clutches 22 on the idler wheels 20 are constructed in the same manner.

The tape platen 43 is a thin plastic disc fixedly connected to the tape hub 44 on which the endless spool of magnetic tape 31 is wound in spiral convolutions about the tape hub with a threading loop portion egressing from its inner most convolution against the tape hub and returning to the peripheral convolution of the spool.

Figure 3:
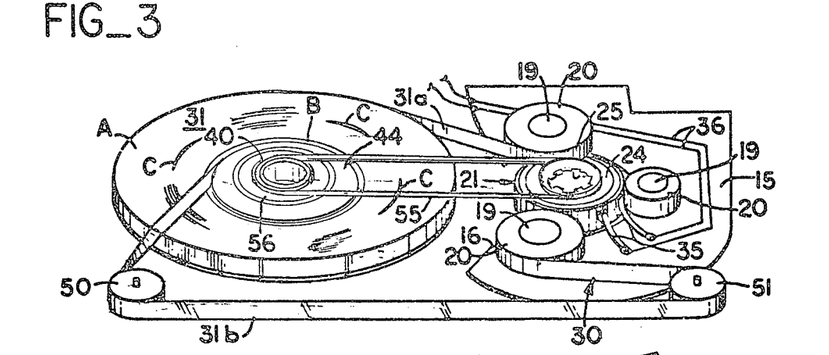
FIG. 3 is a perspective of the internal tape transport mechanisms of the instant invention with an alternate tape threading arrangement along with a secondary slip drive for the tape platen.

In FIG. 1 the threading loop 30 is arranged so that the oxide coating side 31a of the tape is faced against the tape hub 44 while in the embodiment illustrated in FIG. 3 the lubricated side 31b of the tape is faced against the inclined surface of the tape hub. Thus, depending upon the wear pattern and the rub characteristics of the oxide coatings, one threading arrangement over the other may be preferred.

The diameter of the tape hub 44 is smaller where it joins the tape platen 43 so that its peripheral surface will be conical, as can be seen in FIG. 2. This conventional conical surface is employed to prevent the inner most convolutions of the tape from riding up on the hub as the tape egresses therefrom during tape transport. In the most preferred embodiment of the invention, no mechanical power is supplied to the tape platen and it is driven by the action of the magnetic tape being pulled from its tape hub which rotates both the hub and the attached platen carrying the spool of tape on bearing sleeve 40. If desired, a number of raised circular ridges can be made on the surface 12 of the lower case where the platen rubs on this surface to decrease the relative surface area contact and thus decrease the drag on the platen. It is easier for the capstan and auxiliary drive to rotate the tape platen with this friction decreasing arrangement.

Normally, the top surface of the tape platen 43 is smooth and the edges of the convolution of the tape load 31 contacting this surface are free to slide across its face. Since it is desirable to prevent the tape from constricting on the inner convolutions tightly so that a large amount of energy will be required to pull the threading loop from the spool, a unique drive system is provided for the tape platen and its associated tape hub. This tape drive system consists of a drive device composed of a plurality of small elastomer pads or a circular elastomer device that projects radially outwardly a short distance on the top surface of the tape platen from the base of its associated tape hub. Normally, these pads will be fashioned from elastomer materials to increase the frictional drag between the surface of the platen and the edges of the tape convolutions adjacent to the tape hub. Generally, it is desirable that 5 to 30 of the inner most convolutions of the tape have their edges contacting the pads or tape drive means at the base of the tape hub. Of course, the number of pads for the construction of this tape drive system will depend upon the thickness of the tape itself and the tape drive system should be designed for the specific magnetic tape involved.

The tape drive means provided at the base of the tape hub 44 functions to slightly tighten the inner most convolutions (5 to 30 convolutions) adjacent to the hub thereby insuring a positive platen drive as the tape egresses from the inner most convolution. As a result, the tape drive of the tape platen is accomplished by only a few of the inner most spiral convolutions of the magnetic tape which are represented by the shaded area B in the several figures and the drive operates as though only 5 to 30 convolutions are on the platen. While these inner most convolutions are slightly tightened and their edges frictionally driven by the tape drive means adjacent to tape hub, the other convolutions outside these inner most convolutions represented by area A are loose and have occasional gaps C. These outer convolutions of the tape will remain loose throughout the full service life of an endless loop cassette cartridge since the tape drive means prevents any slippage which could tighten all the convolutions on the tape platen interferring with normal operation of the new cassette cartridge. In actual tests, no slippage between the inner most convolutions and the tape hub were observed and the tape remained loose at all times in its outer most convolutions indicated by area A. Further, since the tape returns to the outer most convolution of the tape load and the drive is accomplished at the tape hub, the angular speed is greater at the periphery removing all slack. Of course, the auxiliary drive hub 21 drives with the capstan so no tape slack occurs downstream of the drive hub allowing the threading loop to maintain the proper size at all times.

With the unique tape drive system described above, which accomplishes the platen drive with only a limited number of central convolutions of the tape load and through the use of the auxiliary drive, the magnetic tape may stretch over 20 percent during the service life of the cassette without any change in the size of threading loop nor interference with the tape drive system. This feature represents a major advance over prior art which are seriously affected by changes in the length of the threading loop. See for example "Design Considerations Of A New Continuous Tape Cartridge System" by Ralph E. Cousino, Journal of Audio Engineering Society, January, 1967, Volume 15.

Under tests, it has been demonstrated that the drive accomplished by the inner convolutions of the magnetic tape (15 to 30 spiral turns) remains effective over the service life of the cartridge. In FIG. 2 these inner convolutions are designated as a shaded area B while those convolutions which remained essentially loose during the entire test are designated with the letter A and the periodic gaps in these loose convolutions are indicated by the letters C. In the threading loop 30, the magnetic tape twists 90° as it comes from the inner most convolution contiguous to the tape hub 44 and travels across the flat top of the tape load. On reaching the edge of the tape load, the threading loop continues to guide roller 50 making another 90° twist as it comes off the edge of the tape loads as it feeds to this guide roller. The threading loop then extends across the front of the cassette in a conventional manner in a channel provided for it to a second guide roller 51 where it loops back to one of the idler wheels 20 when threaded according to the pattern shown in FIGS. 1 and 3.

Figures 4, 6:
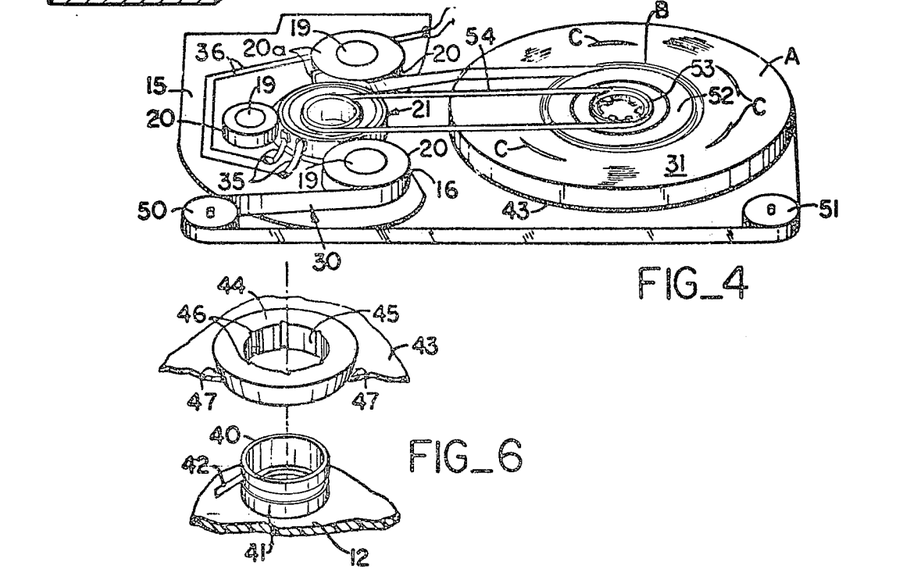
FIG. 4 illustrates in perspective an alternate arrangement for the auxiliary drive mechanism and tape platen wherein the auxiliary drive mechanism is powered through a small belt from the forward reel drive of the recorder.
FIG. 6 is broken away and exploded perspective view of part of the tape platen and its bearing sleeve showing its one-way clutch arrangement in greater detail.

A somewhat different threading pattern is shown in FIG. 4 wherein the floating guide plate 15 is inserted on the left side of the case with its associated idler wheels. Of course, with the drive hub 21 located on this side of the cassette cartridge it cannot be connected directly to the forward reel drive sprocket of the cassette recorder. Thus, to provide a drive for the auxiliary drive hub, a drive spool 52 which includes a central sprocket aperture or opening 53 is inserted to be driven by a forward reel drive sprocket and the hole in the tape hub 44 is enlarged so that it freewheels on the outer peripheral surface of the drive spool. To connect the forward reel drive sprocket to the cassette to the auxiliary drive hub, a belt 54 is connected between the top of the drive spool and the auxiliary drive hub as illustrated in FIG. 4. With such an embodiment, the rachet clutch system cannot be used to prevent reverse rotation of the tape platen 43 and its tape hub 44.

In FIG. 3, an auxiliary assist is used on the tape platen which consist of an inner spool 56 which is driven from the drive hub 21 by a belt 55. This spool free-wheels on bearing 40 and has a disc connected to its bottom surface which rotates under platen 43 providing an auxiliary friction assist for the tape platen. Other types of slip friction drives can be employed but normally this type of an assist is not required. However, in very large tape loads, i.e. 30 minutes of tape, it may be desirable to use an assist on the tape platen to prevent the additional tape load from adding too much drag.

Figure 8:
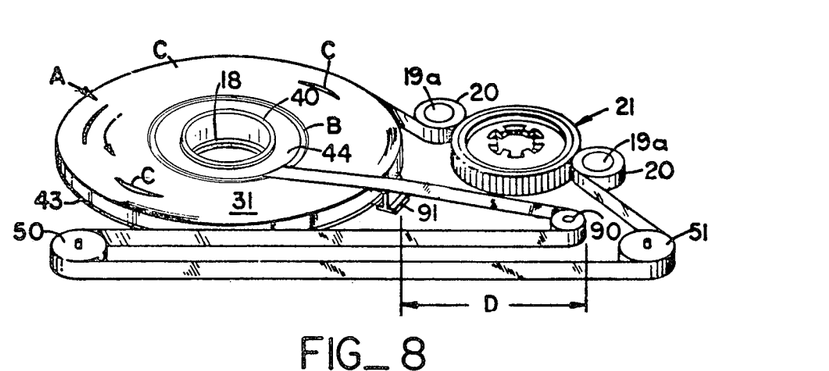
FIG. 8 is a perspective of the platen and auxiliary drive showing a tape threading arrangement for larger endless tape loads which lower the downward loadings on the outer tape convolutions on the platen.

In FIG. 8 an alternate threading arrangement is shown for extremely large tape loads wherein the outer edge of the tape load becomes so close to roller 50 that the angle of the tape is such as it twists from the edge of the load to the roller that it places a considerable down load on the tape platen and makes it more difficult for the system to smoothly advance the tape. In the threading arrangement shown in FIG. 8, the threading loop is arranged so that the tape loops in a parallel to the section between rollers 50 and 51 to a threading roller 90 located on the right side of the cartridge adjacent to the roller 51, and from there it extends to the edge of the tape load and thence to the tape hub 44 as can be seen in FIG. 8. Threaded in this manner, the maximum distance D between the edge of the tape load and the first guide roller can be obtained to lessen the downward pull of the tape platen which becomes measurable with the larger tape loads and a short couple between the edge of the tape load and first guide roller. Further, in FIG. 8, a guide pedestal 91 is employed adjacent to the edge of the tape load to prevent down loadings on the outer convolutions as it will support the tape. Further, this guide pedestal can be employed in the other embodiments between the edge of tape load and guide roller 50.

It should also be appreciated that the drive hub 21 may include top and bottom flanges which will prevent its elastomer surface 23 from contacting the inside surfaces of the case 14 and increase drag, especially in the areas of the deformation caused by the tape guides surrounding the drive hub. Further, these flanges can function as tape guides as well.

A typical cassette recorder of the type referred to in the above specification is illustrated in U.S. Pat. No. 3,394,899, assigned to North American Phillips Company, Inc. and reference is made to that patent for information concerning these cassette recorders.

We claim:

1. An endless loop magnetic tape cartridge for commercially available standard cassette recorders having two spaced reel drive shafts comprising:
   a hollow rectangular cartridge case, said case having two spaced reel drive shaft apertures and a capstan drive aperture for cooperating with the mechanical drives of a standard cassette recorder;
   a flat circular tape platen having a conical tape hub concentrically attached thereto and a flat tape supporting surface, said tape hub mounted inside said hollow rectangular case over a first reel drive shaft aperture;
   an endless spool of magnetic tape spirally coiled on a surface of said flat circular tape platen with its innermost convolution contiguous to said conical tape hub, said endless spool having a threading loop egressing from its innermost convolution and returning to its outermost convolution;
   guide means mounted within said case operably supporting said threading loop therein for engagement with a capstan drive and magnetic responsive means of a standard cassette recorder when said hollow cassette case is inserted therein;
   an auxiliary drive means journalled inside said hollow rectangular case over a second reel drive shaft aperture, said auxiliary drive means having a flat floating plate with a central circular aperture mounted generally concentrically with said second reel drive shaft aperture, a drive wheel mounted over said second reel drive shaft aperture and a plurality of tape guides mounted on said floating plate and circumferentially disposed in spaced relationship about said drive wheel operable to support a portion of said threading loop about a substantial portion of said drive wheel to achieve positive driving engagement therebetween while allowing said drive wheel and said floating plate to move in unison within said rectangular case; and
   coupling means drivingly connecting said drive wheel of said auxiliary drive with one of the reel drive shafts of a standard cassette recorder when said cartridge case is inserted therein whereby the capstan drive will be assisted by said auxiliary drive during operations of said recorder.

2. The endless loop magnetic tape cartridge defined in claim 1 wherein the flat circular tape platen has elastomer frictional drive means disposed on its surface within a limited area about the circumference of the conical tape head and operable to engage the edges of a plurality of the innermost convolutions of the endless spool on said tape platen to enhance the drive between said tape and said platen and the innermost convolutions as the innermost convolution is pulled from said conical tape hub.

3. The endless loop magnetic tape cartridge defined in claim 2 wherein the elastomer frictional drive means has a greater coefficient of friction with the edges of the coil of the tape than the coefficient of friction between said edges and the tape supporting surface of the tape platen.

4. The endless loop cassette cartridge defined in claim 1 wherein the tape guides include a plurality of idler wheels surrounding the drive wheel.

5. The endless loop cassette cartridge defined in claim 4 wherein a one-way clutch to restrict the direction of tape transport is associated with one of the idler wheels.

6. The endless loop cassette cartridge defined in claim 1 wherein the drive wheel includes a resilient drive surface which is deformed by the tape guides to insure positive tape drive on the threading loop.

7. The endless loop cassette cartridge defined in claim 1 wherein the tape hub includes the one-way clutch means to prevent a reverse tape transport.

8. The endless loop cassette cartridge defined in claim 1 wherein the coupling means includes a toothed drive connection associated with the drive wheel that operably connects the auxiliary drive with the forward reel drive shaft of the cassette recorder when the endless loop cassette cartridge is inserted in a cassette recorder.

9. The endless loop cassette cartridge defined in claim 8 wherein the toothed drive connection is part of the drive wheel.

10. The endless loop cassette cartridge defined in claim 8 wherein the toothed drive connection is connected to the drive wheel through belt means.

11. The endless loop cassette cartridge defined in claim 1 wherein switch means are mounted on the floating plate to engage the outer surface of threading loop in an area where said threading loop is supported by the drive wheel within said cartridge and conductive patches are placed on said surface of the magnetic tape to trigger said switch means.

12. An endless loop magnetic tape cartridge suitable for commercially available cassette recorders and players comprising:

a flat, hollow substantially rectangular cartridge case having at least one drive sprocket aperture extending through its top and bottom surfaces, said cartridge case having a plurality of edge apertures along one of its edges for receiving magnetic tape heads and parts of a capstan drive means of such a cassette recorder and player, said cartridge case having a capstan drive aperture in its bottom surface adjacent to said edge aperture for receiving other parts of said capstan drive means;

a circular tape platen having an attached conical tape hub journaled on an inside surface of said cartridge case, said tape platen having a smooth tape supporting surface;

supplementary frictional drive means associated with said circular tape platen within a limited area adjacent to the connection of said platen with said conical tape hub and extending radially therefrom operable to provide an increased edge drive for coils of magnetic tape adjacent to said conical hub due to the increased frictional coefficient between said frictional drive means and the edges of said tape in contact therewith;

an endless spool of magnetic tape spirally coiled on said circular tape platen, said spool having a threading loop egressing from its innermost convolution and returning to its outermost convolution, said endless spool having a plurality of its innermost convolution edge engaging said frictional drive means operable to develop a drive of said tape platen as said innermost convolution is pulled from the tape hub, said frictional drive means having a greater coefficient of friction with the edges of said magnetic tape than the tape supporting surface of said platen;

guide means supporting said threading loop within said cartridge case along said edge apertures where it can be engaged by magnetic tape heads and parts of a capstan drive of such a cassette recorder and player receiving said cartridge case;

an auxiliary drive means journaled on an inside surface of said cartridge case in spaced relationship to said platen and having a drive wheel supporting said threading loop in non-slipping engagement; and mechanical coupling means mounted over said drive sprocket aperture and connected to said auxiliary drive whereby said threading loop will be simultaneously advanced by a recorder and player's capstan drive means and its reel drive sprocket through said auxiliary drive and said auxiliary drive alone when its capstan drive means is disengaged.

13. An improved endless loop magnetic tape cartridge comprising:

a flat, hollow substantially rectangular cartridge case having a plurality of apertures along one of its edges for receiving magnetic heads and parts of a capstan drive, said cartridge having a capstan drive aperture in its surfaces adjacent to its edge apertures;

a circular tape platen having a smooth tape supporting surface and journaled for rotation on an inside surface of said cartridge case;

a tape hub fixedly joined to said platen in concentric relationship, said tape hub having an inverted conical shape and being attached to said platen so its top portion overlays a portion of said platen;

supplementary frictional drive means attached to said platen within said portion of said platen that said top portion of said tape hub overlays, said frictional drive means having a greater coefficient of friction than remaining tape supporting surface of said platen;

an endless spool of magnetic tape spirally coiled on said tape platen, said spool having a threading loop egressing from its innermost convolution against said tape hub and returning to its outermost convolution, said endless spool also having a plurality of its innermost convolution edges engaging said frictional drive means operable to develop an enhanced drive of said tape platen as said innermost convolution is pulled therefrom as said conical tape hub wedges some of said innermost convolutions into said frictional drive means; and guide means supporting said threading loop along said edge apertures where it can be engaged by said magnetic tape heads and parts of a capstan drive of a recorder and player receiving said cartridge case whereby said frictional drive means prevents the outer convolutions of the tape from tightening on said tape hub due to the said edge drive of said circular tape platen by said innermost convolutions of said endless spool of magnetic tape on said tape platen adjacent to said tape hub.

14. A cartridge as claimed in claim 13 wherein the conical tape hub includes a one-way clutch means to prevent reverse rotation of the tape platen.

15. A tape driven platen for holding endless coils of tape-like material comprising a circular disc journaled for rotation in a hollow case and having a smooth tape supporting surface, an inverted conical hub assembly fixedly joined to said disc in a concentric arrangement so it rotates therewith, said outer portion of said conical tape hub overlying a portion of said platen, and frictional drive means attached to said platen within said portion of said platen which the outer portion of said conical hub overlies, said frictional drive means having a greater coefficient of friction with the edges of magnetic tape than the remaining tape supporting surface of said disc, allowing said tape hub and said frictional drive means to develop an efficient edge drive when an endless coil of tape-like material is placed on said disc with a loop egressing from the innermost convolution contiguous to said tape hub and returning to the outermost convolution by wedging the remaining innermost convolutions into said friction drive means, thereby preventing the outer convolutions of said endless spool from tightening on said tape hub due to slippage between said disc and said innermost convolutions.

16. The endless loop magnetic tape cartridge defined in claim 15 wherein the frictional drive means extends radially on the circular tape platen sufficiently to edge engage up to 30 of the innermost convolutions of the endless coil of tape-like material which is supported on the circular tape platen and said frictional drive means.

17. The endless loop magnetic tape cartridge defined in claim 16 wherein the frictional drive means extends radially on the tape platen sufficient to edge engage from 5 to 30 of the innermost convolutions of the endless coil of tape-like material on said tape platen and said frictional drive means.

18. The tape driven platen defined in claim 13 wherein the frictional drive means extends radially on the disc from the tape hub a distance sufficient to edge engage approximately 30 convolutions of the innermost convolutions of the endless spool of magnetic tape surface and frictional drive means.

* * * * *